United States Patent
Mandapuram et al.

(10) Patent No.: US 9,229,892 B2
(45) Date of Patent: Jan. 5, 2016

(54) SHARED PERIPHERAL COMPONENT INTERCONNECT EXPRESS (PCIE) END POINT SYSTEM WITH A PCIE SWITCH AND METHOD FOR INITIALIZING THE SAME

(71) Applicant: Avalanche Technology, Inc., Fremont, CA (US)

(72) Inventors: Anilkumar Mandapuram, San Jose, CA (US); Siamack Nemazie, Los Altos Hills, CA (US)

(73) Assignee: AVALANCHE TECHNOLOGY, INC., Fremont, CA (US)

( * ) Notice: Subject to any disclaimer, the term of this patent is extended or adjusted under 35 U.S.C. 154(b) by 0 days.

(21) Appl. No.: 14/253,453

(22) Filed: Apr. 15, 2014

(65) Prior Publication Data

US 2014/0281069 A1 Sep. 18, 2014

Related U.S. Application Data

(62) Division of application No. 13/856,395, filed on Apr. 3, 2013, now Pat. No. 8,806,098.

(60) Provisional application No. 61/801,158, filed on Mar. 15, 2013.

(51) Int. Cl.
| | |
|---|---|
| G06F 13/00 | (2006.01) |
| G06F 13/28 | (2006.01) |
| G06F 13/40 | (2006.01) |
| G06F 9/44 | (2006.01) |
| G06F 13/24 | (2006.01) |

(52) U.S. Cl.
CPC .............. *G06F 13/28* (2013.01); *G06F 9/4411* (2013.01); *G06F 13/24* (2013.01); *G06F 13/4022* (2013.01)

(58) Field of Classification Search
USPC ....................... 710/104–110, 305–317, 36–43
See application file for complete search history.

(56) References Cited

U.S. PATENT DOCUMENTS

| | | | |
|---|---|---|---|
| 8,463,881 B1* | 6/2013 | Baker et al. .................. 709/220 |
| 2008/0034147 A1* | 2/2008 | Stubbs et al. ................. 710/315 |
| 2011/0320758 A1* | 12/2011 | Craddock et al. ............. 711/206 |
| 2011/0320887 A1* | 12/2011 | Craddock et al. ............... 714/49 |
| 2012/0151471 A1* | 6/2012 | Brownlow et al. ............... 718/1 |
| 2012/0185634 A1* | 7/2012 | Shirai et al. ................... 710/316 |
| 2012/0303948 A1* | 11/2012 | Auernhammer et al. ..... 713/150 |
| 2013/0019108 A1* | 1/2013 | Auernhammer et al. ..... 713/190 |
| 2013/0145052 A1* | 6/2013 | Aiken et al. ...................... 710/9 |
| 2013/0166874 A1* | 6/2013 | Auernhammer et al. ..... 711/204 |

* cited by examiner

*Primary Examiner* — Raymond Phan
(74) *Attorney, Agent, or Firm* — Maryam Imam; IPxLaw Group LLP

(57) ABSTRACT

A method of accessing a server address space of a shared PCIe end point system includes programming a primary address translation table with a server address of a server address space, setting up a direct memory access (DMA) to access a primary port memory map, the primary port memory map correlating with addresses in the primary address translation table, and re-directing the direct memory accesses to the primary port memory map to the server address space according to the primary address translation table.

13 Claims, 7 Drawing Sheets

US 9,229,892 B2

SHARED PERIPHERAL COMPONENT INTERCONNECT EXPRESS (PCIE) END POINT SYSTEM WITH A PCIE SWITCH AND METHOD FOR INITIALIZING THE SAME

CROSS REFERENCE TO RELATED APPLICATIONS

This application is a divisional of pending U.S. patent application Ser. No. 13/856,395, filed on Apr. 3, 2013, by Anilkumar Mandapuram, and entitled "MULTI ROOT SHARED PERIPHERAL COMPONENT INTERCONNECT EXPRESS (PCIE) END POINT", which claims priority to U.S. Provisional Application No. 61/801,158, filed on Mar. 15, 2013, by Anilkumar Mandapuram and entitled, "MULTI ROOT SHARED PERIPHERAL COMPONENT INTERCONNECT EXPRESS (PCIE) END POINT".

BACKGROUND OF THE INVENTION

1. Field of the Invention

This invention relates generally to Peripheral Component Interconnect Express (PCIe) and particularly to sharing PCIe end points across servers.

2. Background

The Peripheral Component Interconnect Express (PCIe) Specification allows only one host (one root) in the PCIe hierarchy. The PCI Multi Root IO Virtualization (MRIOV) Specification addresses how a PCIe end point, an example of which may be a High Bandwidth Input/Output (IO) resource, can be shared across multiple servers/hosts. Today, there is no support available for MRIOV in the entire eco system (eco system consisting of hosts, drivers, switch, and PCIe devices). There has been an attempt by the PCIe switch manufacturers to address this by adding a Non Transparent Bridge (NTB) ports to the PCIe switch. The existing solution however requires management software on all the servers and the "Shared PCIe subsystem" (PCIe subsystem consists of PCIe switch with NT ports, a local processor which acts as the root complex and the PCIe device). The management software is required because the server enumerates the PCIe end point as a Non Transparent Bridge port. The driver does not know what to do with the NTB. The device drivers for the end point behind the switch that exists on the server do not get loaded automatically. The Management Software on the server and on the shared PCIe subsystem have to communicate with each other and share the capabilities of the PCIe subsystem.

Another issue with using a PCIe switch with NT ports is that the entire memory space of the server cannot be exposed to the switch, rather, only a portion of the memory on the server is available for data transfer. In a PCI system, the end point can access the entire memory space of the server, which requires the server to move the data into the memory space mapped for the end point to access. This requires extensive changes to the existing device drivers and adds to the latency.

What is needed is a device and method for enabling sharing of a PCIe end point across multiple servers as a plug-n-play device.

SUMMARY OF THE INVENTION

Briefly, a method of accessing a server address space of a shared PCIe end point system includes programming a primary address translation table with a server address of a server address space, setting up a direct memory access (DMA) to access a primary port memory map, the primary port memory map correlating with addresses in the primary address translation table, and re-directing the direct memory accesses to the primary port memory map to the server address space according to the primary address translation table.

These and other objects and advantages of the invention will no doubt become apparent to those skilled in the art after having read the following detailed description of the various embodiments illustrated in the several figures of the drawing.

IN THE DRAWINGS

FIG. 1 shows a shared PCIe end point system 100 for sharing a PCIe end point 116 across multiple servers 102_0 to 102_*n* where 'n' is an integer, using a PCIe switch 108, in accordance with an embodiment of the invention.

DETAILED DESCRIPTION OF VARIOUS EMBODIMENTS

As will be evident in the various methods and apparatus of the invention, a Peripheral Component Interconnect Express (PCIe) End Point subsystem enables sharing of PCIe end point across multiple servers as a plug-n-play device. In some embodiments of the invention, A PCIe switch's NT port has a secondary port that is configured as a PCIe end point, and further has a primary port that is configured is as a bridge. In an embodiment of the invention, an interrupt is generated to the root complex when there are any changes to the PCI configuration of the secondary port. In an embodiment of the invention, a primary address translation table is dynamically configured based on the address pointers inside the Direct Memory Access (DMA) descriptors submitted by the server.

Figure 1:
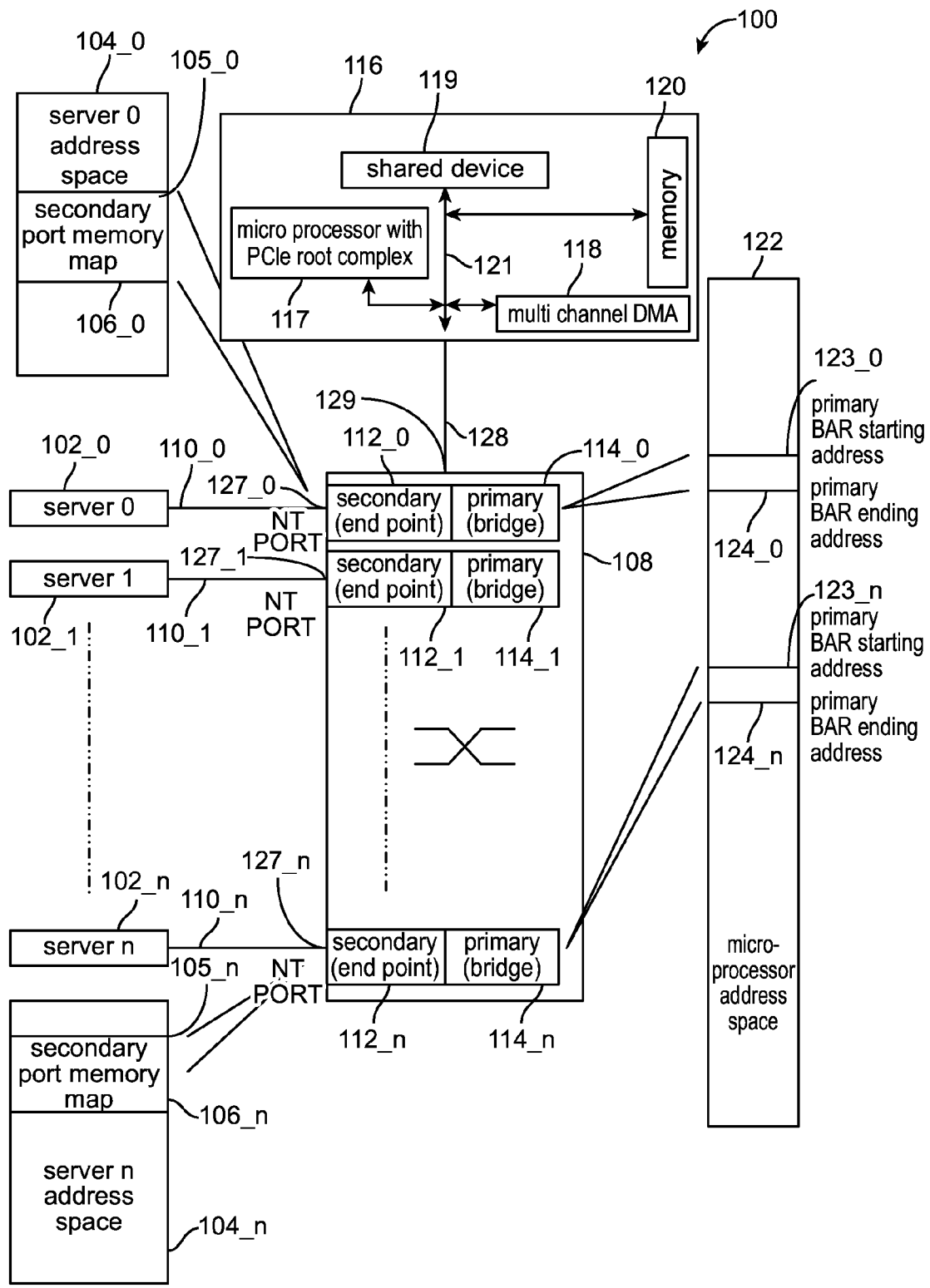

FIG. 1 shows a shared PCIe end point system 100 for sharing a PCIe end point 116 across multiple servers 102_0 to 102_*n* where 'n' is an integer, using a PCIe switch 108, in accordance with an embodiment of the invention. The system 100 is shown to include Shared PCIe End Point 116, a PCIe switch 108 having n NT ports, and 'n' number of servers 102_0 to 102_*n*. The secondary port 112 is mapped to a secondary port memory map 106 of a server address space 104 and micro-processor micro-processor address space 122. The server address space 104 is the servers' address space and the micro-processor address space 122 is the micro-processor's 117 address space.

In the system 100, the servers 102 are shown coupled to the PCIe switch 108 through non-transparent (NT) ports 127 and PCIe busses 110. Further, the PCIe switch 108 is shown coupled to the shared PCIe end point 116 through a transparent bridge port 129 through a PCIe bus 128. The PCIe switch 108 is shown to include a secondary port 112 and a primary port 114 and an exploded view of the memory map that is shown assigned to the secondary port 112 in the server's address space 104. The server address space 104 is shown to include the secondary port memory map 106. Similarly, an exploded view of the memory map assigned to the secondary port 112_n is shown to include a secondary port memory map 106_n and a server address space 104_n. In fact, while not shown for the sake of brevity, each of the secondary ports 112_0 through 112_n includes a secondary port memory map 106 and a server address space 104.

As will become evident shortly, in the embodiment of FIG. 1, multiple servers share a PCIe Input/Output (IO) End Point through non-transparent (NT) ports of the switch. Further, memory mapping of the servers to the secondary configuration Base Address Resisters (BAR) is realized and the memory map of the PCIe end point subsystem to the primary configuration BAR is also realized.

The shared PCIe end point 116 of the shared PCIe end point system 100 is shown to include a micro-processor with PCIe root complex 117, memory 120, a multi-channel DMA 118 and a shared device 119. The shared device 119 may be any type of device. The micro-processor 117, memory 120, multi-channel DMA 118 and the shared device 119 are coupled together using a high bandwidth system bus 121, which is shown coupled to the PCIe bus 128, in the embodiment of FIG. 1. In alternate embodiments, the shared device 119 can also be coupled to the micro-processor 117 through a PCIe interface. The coupling between components in the shared PCIe end point 116 is merely an example.

The PCIe bus 128 couples the shared PCIe endpoint 116 to the switch transparent bridge port 129.

The PCIe switch 108 is shown to include a secondary port 112_0, and 112_1 to 112_n and Primary Port 114_0, and 114_1 to 114_n in its non transparent bridge ports.

The server 0 102_0 is shown coupled to the non-transparent bridge secondary port 112_0 of the PCIe switch 108 through the NT port 127_0 and the PCIe bus 110_0, The server 1 is shown coupled to the non transparent bridge secondary port 112_1 of the PCIe switch 108 through the NT port 127_1 and the PCIe bus 110_1 and server n is shown coupled to the non transparent bridge secondary port 112_n of the PCIe switch 108 through the NT port 127_n and the PCIe bus 110_n.

The shared PCIe end point 116 is shown coupled to the transparent bridge port of the PCIe switch 108 through the PCIe bus 128.

The PCIe switch 108 is used as system interconnect switch for PCIe packet switching that supports simultaneous peer-to-peer traffic flows. The PCIe switch 108 has non-transparent bridging functionality that allows multiple hosts (servers) to be connected to the switch ports. Non-transparent bridge (NTB) ports are required when two or more PCIe domains need to communicate to each other. The main function of the NTB is to translate addresses and allow data exchange across PCIe domains, as is known to those in the industry. All of the foregoing interfaces are known in the art.

Figure 2:
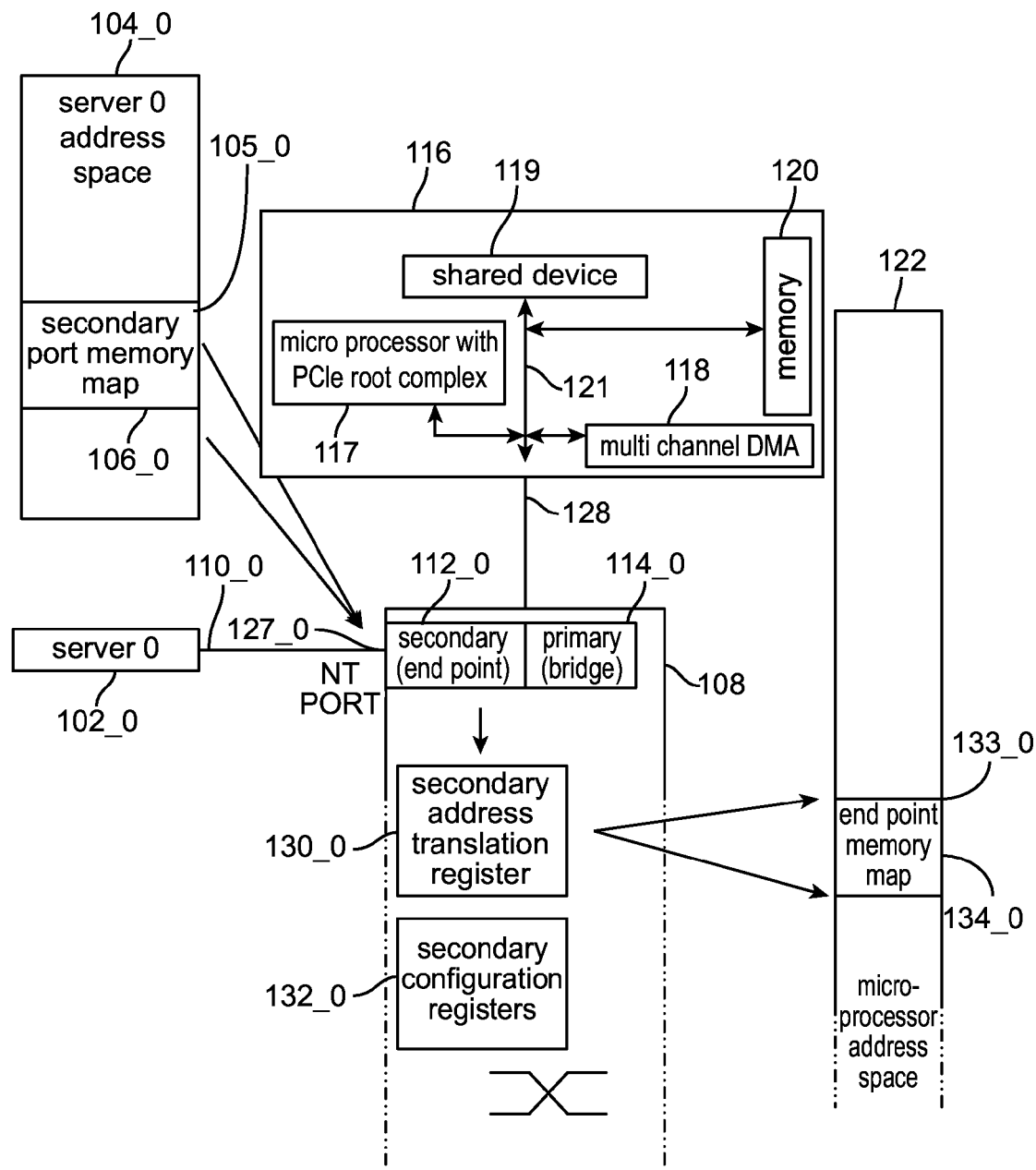
FIG. 2 shows further details of the system 100, in accordance with an embodiment of the invention.

FIG. 2 shows further details of the system 100, in accordance with an embodiment of the invention. The system 100 of FIG. 2, has an interrupt feature, in accordance with an embodiment and method of the invention.

In FIG. 2, the shared device 119 is shown to be shared across multiple servers over PCIe (one example is, without limitation, a shared storage device). The micro-processor 117 has PCIe root complex functionality and is used to enumerate the PCIe switch 108. It also manages the primary and secondary port configurations of the NT ports of PCIe switch 108. The micro-processor 117 also services the interrupt messages especially generated due to changes in the secondary configuration registers of the secondary ports 112_0, 112_1 to 112_n. The micro-processor 117 can be of any kind and further can be embedded. An exemplary microprocessor is the Intel-manufactured x86 type of processor. There are no limitations on the micro-processor used in the various embodiments of the invention. The memory 120 shown in FIG. 1 is used as system memory, and it can be of any memory type. The multi-channel DMA 118 is used to enable transfer of data from one memory map to another memory map. All of the above is known to a person of ordinary skill in the art.

In operation, multiple servers are connected to the shared PCIe end point 116 through NT ports of the PCIe switch 108. Each NTB port 127 of the PCIe switch 108 provides two PCI type0 configuration ports, a primary configuration port and a secondary configuration port. The NTB port which is connected to the server 102_0 through PCIe bus 110_0 has primary port 114_0 and secondary port 112_0. Each of these ports has their PCI configuration space and registers.

The PCI configuration space corresponding to the secondary port 112_0 is modified to look like the configuration space of the shared PCIe end point 116 (such as a mass storage device) so that when server 102_0, for example, enumerates, it will find a PCIe end point 116 (Mass Storage device as an example) instead of a NT bridge port.

Assuming that the server 102_0 has drivers for the PCIe end point 116 (as an example mass storage device—where in shared device 119 is a storage array), the drivers will be loaded automatically after the PCIe enumeration. The server 102_0 will not be aware that it is connected to a shared PCIe end point 116 through a switch 108 NTB port. The server 102_0 will not be aware of other servers 102_1 to 102_n sharing the PCIe End Point 116.

The following are PCI configuration registers which are part of PCIe configuration registers 132_0 as shown in FIG. 2 are used by the PCI drivers on server 102_0 to identify the PCIe end point.

Vendor ID Register
Device ID Register
Revision ID Register
Class Code Register
Subsystem Vendor ID
Subsystem ID As part of PCI device enumeration the server 102_0 will write to the secondary configuration registers 132_0 in FIG. 2. The writes to the secondary configuration registers will generate an interrupt message to the micro-processor 117. The message will indicate the NT port with secondary port 112_0 as the source of the interrupt. The micro-processor 117 will read the configuration registers of secondary port 112_0 to detect the changes to the secondary configuration space. The server 102_0 can write to certain configuration registers as needed and such writes will trigger an interrupt message to the micro-processor 117. This interrupt is used by the micro-processor 117 to take action based on the changes to PCIe configuration registers 132_0.

The PCIe configuration space has Base Address Registers (BAR) which is used to map the PCIe end point resources to the systems memory map where in the root complex that enumerated the end point is part of. The system will access the PCIe end point using the memory map assigned to it. The PCIe end point will accept all the traffic with address range that fall within the programmed BAR registers. The PCIe end point can initiate a transfer to access any address space inside the system. All of the above would be known to a person of ordinary skill in the art.

The micro-processor 117 will initialize the secondary port 112_0 configuration BAR registers to request the memory segment to be mapped into server 102_0 address space 104_0. The mechanism by which the end point requests a memory segment to be mapped to systems memory map (address space) would be known to a person of ordinary skill in the art. The micro-processor 117 as part of initialization will assign a end point memory map 134_0 at end point memory offset 133_0 (End point memory offset) as in FIG. 2 to the PCIe end point associated with server 102_0 from micro-processor address space 122. Further the micro-processor 117 programs the secondary address translation register 130_0 with an end point memory offset 133_0, as shown in FIG. 2, to redirect all accesses from the server 102_0 that are directed to the secondary port memory map 106_0 to the end point memory map 134_0. The secondary address translation register 130_0 is associated with BAR registers of configuration space of secondary port 112_0. The size of the memory window will depend upon the functionality of the PCIe End Point. The server 102_0 during enumeration maps a memory segment to the secondary port 112_0 to access the shared PCIe end point 116. In FIG. 1, only one memory segment is shown (BAR0/1) in 64-bit addressing. There could be additional, 2 more segments BAR2/3 and BAR4/5 in case of 64 bit addressing. If the addressing is 32 bit there could be 6 memory segments BAR0, BAR1, BAR2, BAR3, BAR4 and BAR5. After the configuration read of the secondary port 112_0 BAR registers the server 102_0 will assign a secondary port memory map 106_0 and does configuration write to the BAR registers of secondary port 112_0 with secondary port memory map offset 105_0 which is the starting address of the secondary port memory map 106_0. The server 102_0 is now ready to use the hardware (PCIe end point) connected on its PCIe hierarchy.

After the enumeration of the end point, the end point is ready for operation. In general the end point will perform a function that would require DMA of data from/to system memory. In PCI hierarchy, the PCI device can access the entire memory space of the system of which it is part of. The device drivers for the PCI device (end point) are written with this assumption that the PCI end point can access the entire memory space.

In system 100 for sharing a PCIe end point 116 though a NT port of the PCIe switch the shared end point will not be able to access the entire memory space of the servers. The mechanism through which the shared PCIe end point can access the server memory space is through pre-configured memory window associated with the primary port (which is done by programming BAR registers inside the configuration space of primary port) and primary address translation table. In such systems primary address translation table are managed by the server. This scheme only opens up a small memory region on the server for access by the end point.

Figure 3:
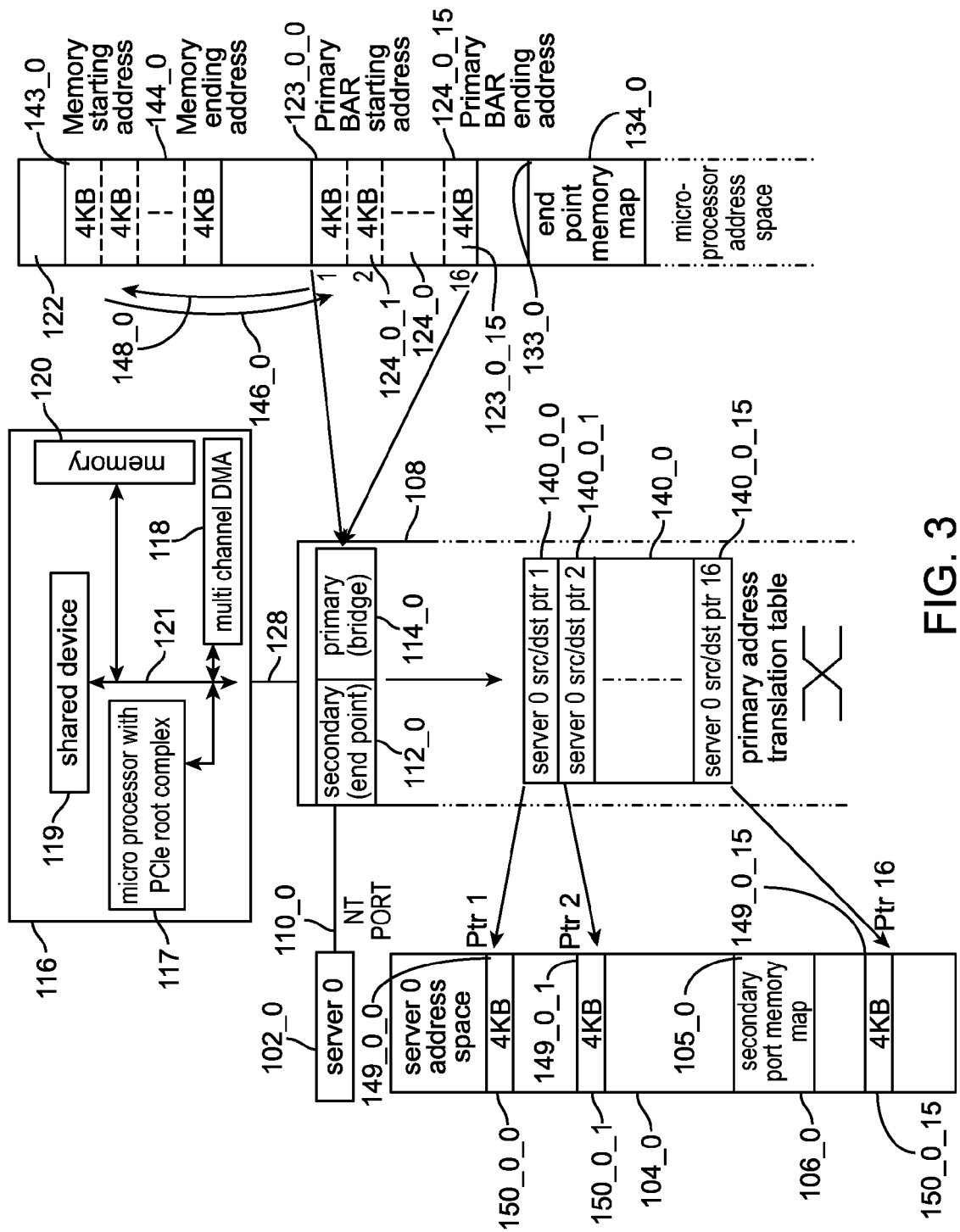
FIG. 3 shows another exemplary embodiment and method of the invention using the shared PCIe end point system 100.

In the proposed method, the PCIe end point which is shared across multiple roots can access the entire memory map of each server. FIG. 3 will be used to illustrate this method. The server page size is fixed; it is either 4 KB or 8 KB. In some systems it can be as high as 128 KB. In our illustration we assume the server page size as 4 KB. The server may create a data buffer of 64 KB using 16 4 KB pages or any other size using 4 KB pages. These pages are not physically contiguous. These pages can be anywhere in the system (server 102_0) memory map. This layout of data will require a method to access the entire server address space 104_0 of the server 102_0.

As part of initialization, the micro-processor 117 enumerates the primary port 114 of the PCIe switch's 108 NT ports 127. As part of primary port 114_0 enumeration the micro-processor 117 assigns a primary port memory map 124_0 (primary port memory segment) to the primary port from micro-processor address space 122 to the Primary Port 114_0. The size of memory segment is dependent upon the number of channels that are available on the DMA (multi-channel DMA 118) and the size of the page in server 102_0.

For further clarification, an example is now provided. Assuming that the DMA has 16 channels and the page size is 4 kilo bytes (KB) in the server 102_0, the micro-processor 117 selects 64 KB primary port memory map 124_0 and assigns it to the primary port 114_0 by programming the BAR registers in configuration space of the primary port 114_0 with primary port memory segment 0 pointer 123_0_0. The 64 KB memory segment can be realized as 16 4 KB primary port memory segments 124_0_0, 124_0_1 to 124_0_15, with primary port memory segment pointers 123_0_0, 123_0_1 to 123_0_15 respectively. The difference between the address offsets 123_0_0 and 123_0_1 is 4 KB as the primary port memory segment 124_0_0 is 4 KB. There is a Primary Address Translation Table 140_0 associated with the primary port 114_0. It is shown in the FIG. 3 that the primary address translation Table has 16 primary address translation table entries 140_0_0, 140_0_1 to 140_0_15 but it is just an example and it is not limited to 16. Any access by the shared PCIe end point to primary port memory segment 124_0_0 will be translated into the server 0 102_0 address space 104_0 using the primary address translation table 140, primary address translation table first entry 140_0_0, similarly access by shared PCIe end point to primary port memory segment 124_0_1 is translated to server 0 102_0 address space 104_0 using primary address translation table 140_0, primary address translation table second entry 140_0_1 and so on.

In operation, the device drivers on the server 102_0 will operate as if the end point is attached to it directly. After the device driver configures the end point the end point is ready to perform the intended function. As part of its function, the end point has to perform DMA from/to server's 102_0 address space 104_0. In the process the server 102_0 will create DMA descriptors for the end point to service. The server 102_0 will either DMA these descriptors or passes over the pointer to these descriptors to the PCIe end point 116. The server 102_0 will use secondary port memory map 106_0 to DMA the descriptors or write the descriptor pointer to end point memory map 134. The access by server 102_0 to secondary port memory map 106_0 will be translated by secondary address translation register 130_0 as in FIG. 2 to end point memory map 134_0. The descriptors will have source (destination) address pointers pointing to server 102_0 address space 104_0 (can be anywhere in its memory space). Source address pointer in case reading the data from server memory and destination address pointer in case writing to server memory. The device driver on server 102_0 will notify the end point to perform the DMA of the descriptors by handing over the pointer to the starting descriptor and number of descriptors. The device driver can access the end point memory using the secondary port memory map 106_0. The shared PCIe end point 116 has the pointer to the descriptors inside the server 102_0 address space 104_0 and number of descriptors to be fetched. This pointer cannot be used by the shared PCIe end point to initiate the DMA because the address pointer belongs to server 102_0 address space 104_0. The micro-processor 117 inside the shared end point 116 will program the primary address translation table 140 with the address pointer that points to the starting descriptor. Any access by the shared end point 116 to primary port memory segment 124 will hit the primary port 114_0 and will be address translated to server 102_0 address space 104_0 using primary address translation table 140. The Shared PCIe end point 116 can read the descriptors from server 102_0 address space 104_0. After fetching the descriptors the Shared PCIe end point 116 will start processing the descriptors. The source (destination) address pointers depending upon read(write) to server memory in each of these descriptors will be pointing to various locations inside the server 102_0 address space 104_0. In this example we have assumed a 16 channel DMA 118. The data buffers corresponding to these descriptors are dispersed across the server 102_0 address space 104_0. The Shared PCIe end point 116 will program the primary address translation table 140_0 with the DMA source(destination) address. The shared PCIe end point 116, will initiate the DMA with source(destination) address pointing to primary port memory segment 124 in micro-processor address space 122. These accesses get translated to server 102_0 address space 104_0. Any access that is address to primary port memory segment 124_0_0 will be translated using primary address translation table first entry 140_0_0 whose contents are server buffer pointer 149_0_0 which will point to new address in server 102_0 address space 104_0, in this case server buffer pointer 149_0_0. Resulting in, any access by the shared end point to primary port memory segment 124_0_0 will result in access to server buffer 149_0_0 in server 102_0. Similarly access to primary port memory segment 124_0_1 will be translated to server buffer pointer 149_0_1 and so on. Once the DMA is complete, the shared end point 116 can re-use the primary address translation Table 140 entry to initiate another DMA. FIG. 3 shows another exemplary embodiment and method of the invention using the system 100. The example of FIG. 3 shows dynamically programming of the Primary Address Translation table and using Primary BAR to access any memory segment inside the server.

In FIG. 3, at 146_0, there is shown a write to server memory, where the multi-channel DMA is programmed with a source as a segment of the micro-processor memory map 144_0 (mapped to micro-processor memory 120) and a destination as a segment of the primary port memory map 124_0. At 148_0, there is shown a read from the server memory, where the multi-channel DMA is programmed with a source as a segment of the primary port memory map 124_0 and a destination as a segment of the micro-processor memory map 144_0. Read or write to the primary port memory map 124_0 is translated using the primary address translation table 140_0 and the access is directed to the address space 104_0 of the server 102_0.

By having shared end point 116 dynamically manage the programming of the primary address translation table 140_0, the shared end point 116 can access the entire address space 104_0 of the server 102_0. With multiple servers 102_0, 102_1 to 102_n connected to the shared PCIe end point, this method can be used to access the entire address space of the servers using a small memory segment assigned to the primary port memory map 124_0, 124_1 to 124_n in the micro-processor address space 122 of the shared PCIe end point 116.

Figure 4:
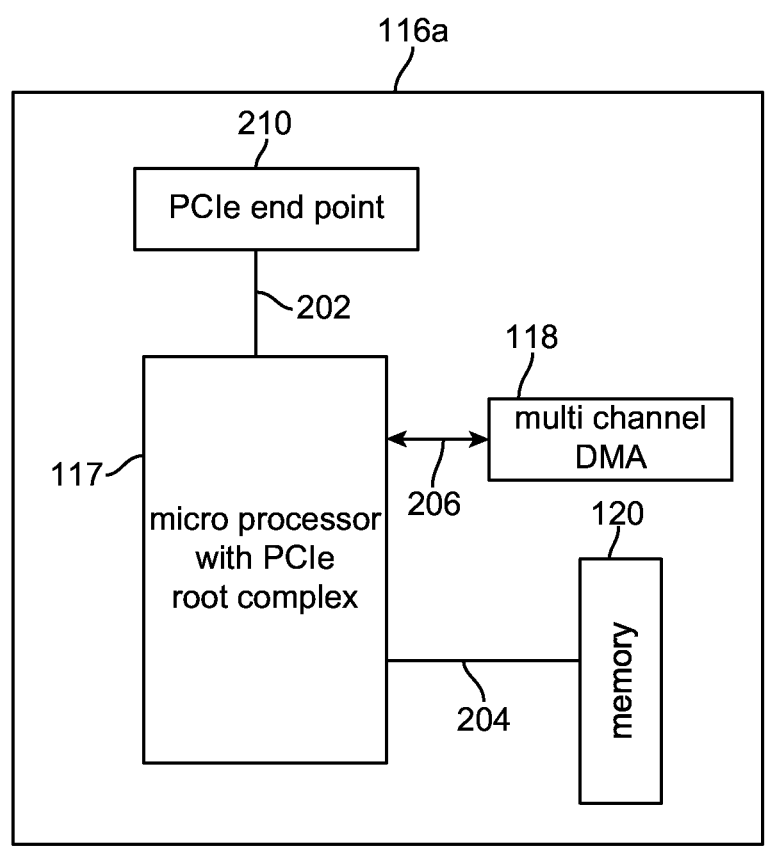
FIG. 4 shows a Shared PCIe end point 116*a*, in accordance with yet another embodiment of invention.

FIG. 4 shows a Shared PCIe end point 116a, in accordance with yet another embodiment of invention. The Shared PCIe End Point 116a is analogous to the Shared PCIe End Point 116 with the exception that the PCIe End Point 210 is the shared device 119 as shown in FIG. 1. The PCIe End Point 210 as shown in FIG. 4 is coupled with the Micro-Processor 117 through a PCIe bus 202. The memory 120 is coupled to the Micro-Processor using memory bus 204. Multi-channel DMA 118 is coupled to the micro-processor using system bus 206

Figure 5:
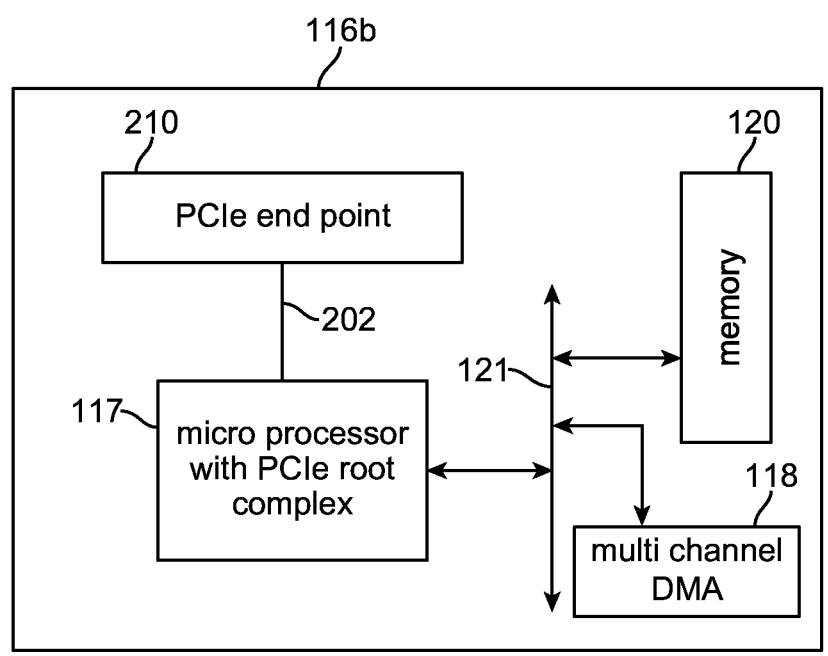
FIG. 5 shows a Shared PCIe end point 116*b*, in accordance with yet another embodiment of invention.

FIG. 5 shows a Shared PCIe end point 116b, in accordance with yet another embodiment of invention. The Shared PCIe End Point 116b is analogous to the Shared PCIe End Point 116 with the exception that the PCIe End Point 210 is the shared device 119 as shown in FIG. 1. The PCIe End Point 210 as shown in FIG. 4 is coupled with the Micro-Processor 117 through a PCIe bus 202. The memory 120 and multi-channel DMA 118 is coupled to the micro-processor using system bus 206

Figure 6:
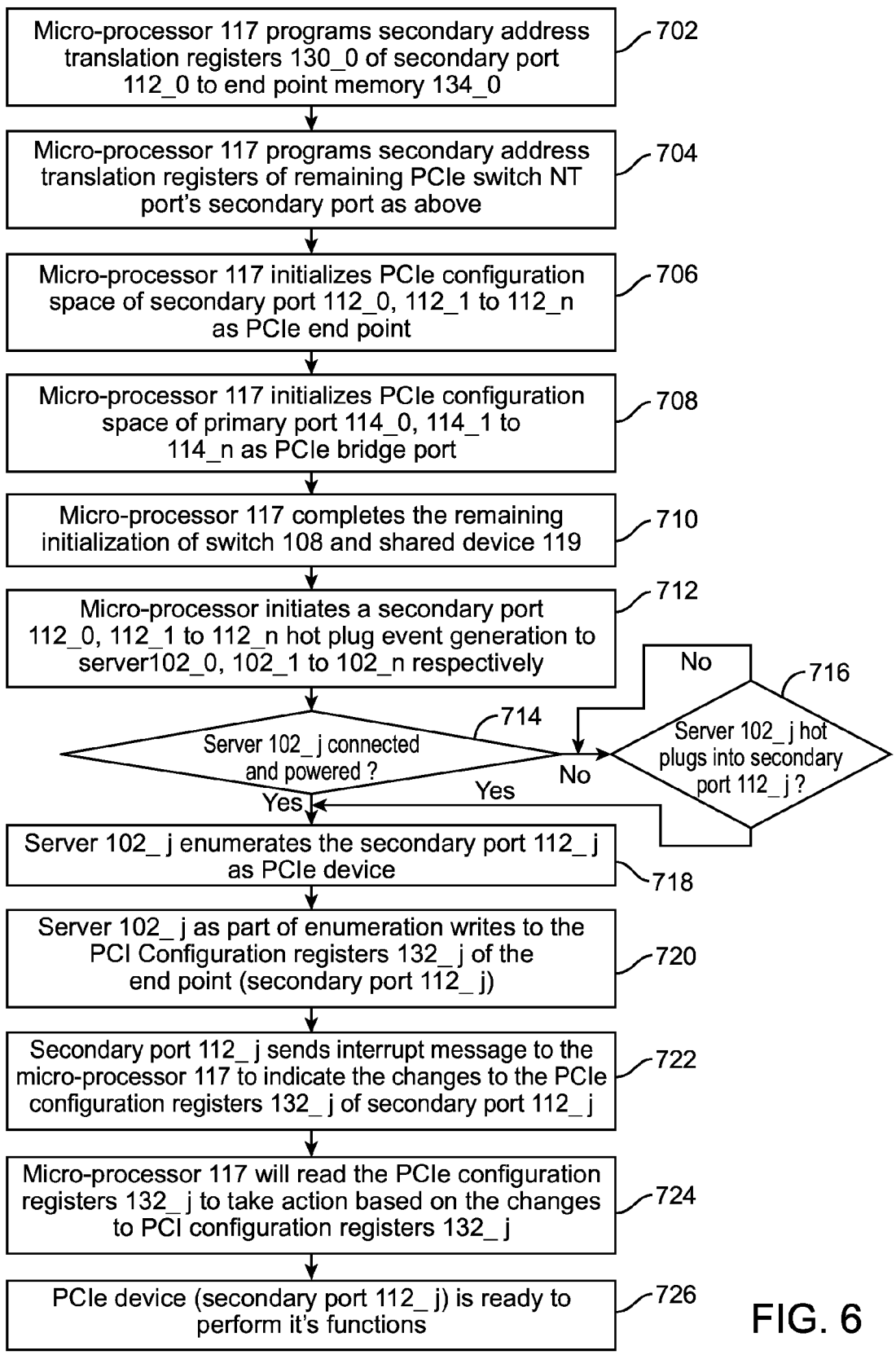
FIG. 6 shows a flow chart of the relevant steps performed for PCIe end point initialization and enumeration, in accordance with a method of the invention.

FIG. 6 shows a flow chart of the relevant steps performed for PCIe end point initialization and enumeration, in accordance with a method of the invention. In FIG. 6, at step 702, the micro-processor 117 programs the secondary address translation registers 130_0 of the secondary port 112_0 to map any accesses to the secondary port memory map 106_0 to the endpoint memory map 134_0. From then on, any access to the secondary port memory map 106_0 results in the secondary address translation register 130_0 to re-direct the access to the endpoint memory map 134_0. The address of the location to be accessed is saved in the secondary address translation register 130_0. Next, at step 704, in FIG. 6, the micro-processor 117 programs secondary address translation registers of the remaining PCIe switch NT port's secondary port, as discussed above relative to step 702. Next, at step 706, the micro-processor 117 initializes the PCIe configuration space of the secondary port 112_0, and 112_1 to 112_n as a PCIe endpoint. Next, at set 708, the micro-processor 117 initializes the PCIe configuration space of the primary port 114_0, and 114_1 to 114_n as a PCIe bridge port. Next, at step 710, the micro-processor 117 completes the remaining initialization of the switch 108 and the shared device 119. Next, at step 712, the micro-processor initiates a secondary port 112_0 and 112_1 to 112_n hot plug event generation to the server 102_0 and 102_1 to 102_n, respectively.

Next, at 714, a determination is made as to whether or not the server 102_i is connected and powered (operational) and if so, the process continues to step 718, otherwise, the process goes to 716 where another determination is made as to whether or not the server 102_i ("i" being an integer value) hot plugs into the secondary port 112_i and if not, the process waits until the server 102_i hot plugs into the secondary port 112_i, otherwise, the process continues to step 718.

At step 718, the server 102_i enumerates the secondary port 112_i as a PCIe device. Next, at step 720, the server 102_i, as a part of the enumeration, writes to the PCI configuration registers 132_i of the endpoint (the secondary port 112_i). Next, at step 722, the secondary port 112_i sends an interrupt message to the micro-processor 117 to indicate the changes to the PCIe configuration registers 132_i of the secondary port 112_i. Next, at step 724, the micro-processor 117 reads the PCIe configuration registers 132_i to take action based on the changes to the PCI configuration registers 132_i. Next, at step 726, the PCIe device (secondary port 112_i) is ready to perform its function during regular operation of the system.

It is understood that while specific ports/registers or other devices are indicated herein, such the secondary port 112_i, any port/register or structure analogous may be used instead and the references to the specific structures merely serve as examples.

Figure 7:
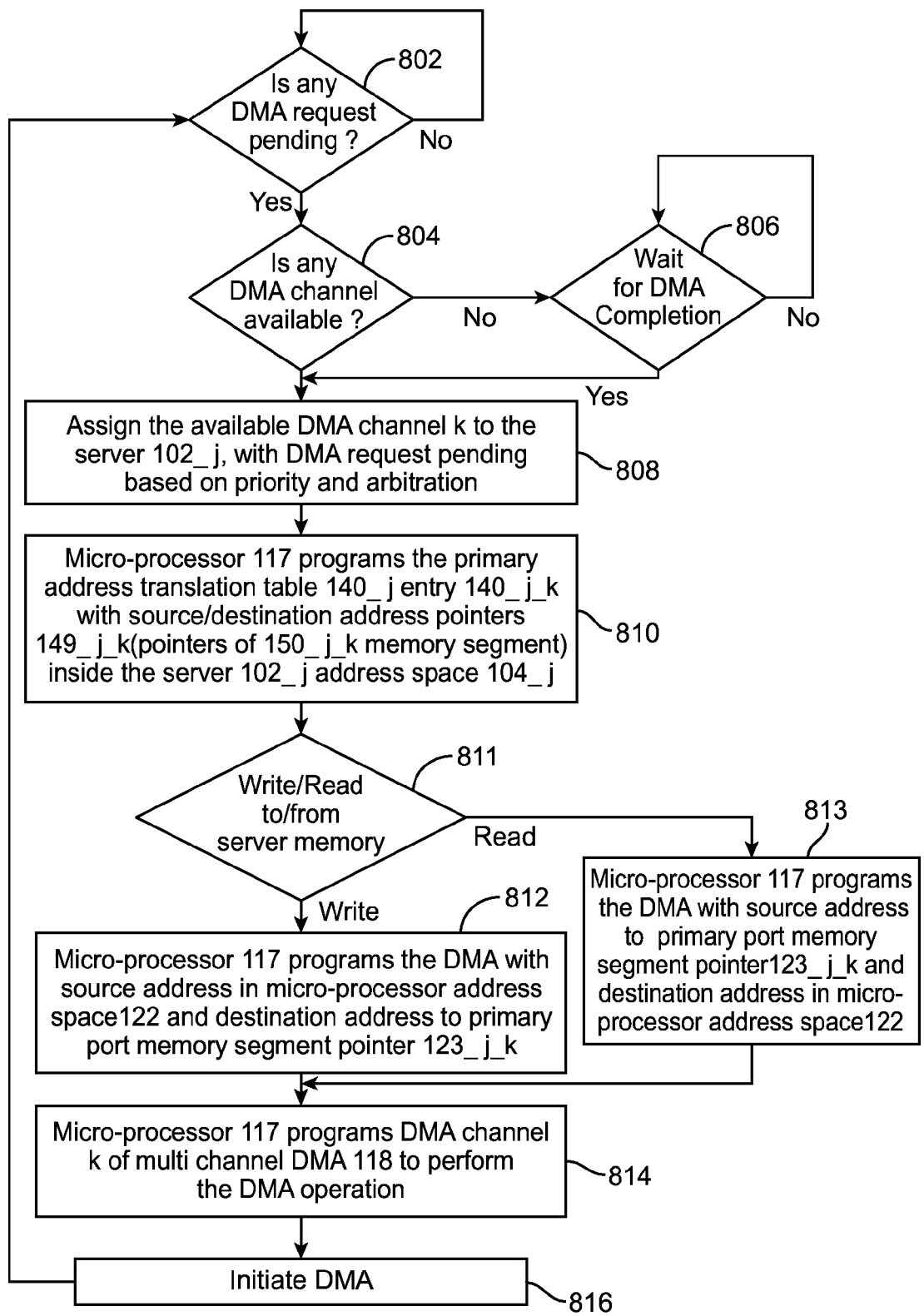
FIG. 7 shows a flow chart of the relevant steps during DMA using the various embodiments of the invention and in accordance with a method of the invention.

FIG. 7 shows a flow chart of the relevant steps during DMA using the various embodiments of the invention and in accordance with a method of the invention. More specifically, the flow chart of FIG. 7 shows the process for dynamically programming the primary address translation tables. At 802, in FIG. 7, a determination is made as to whether or not there are any pending DMA requests and if not, the process waits at 802 until there is and then, continues on to 804 where another determination is made as to whether or not, a DMA channel is available and if not, the process continues to 806, otherwise, the process continues to the step 808. At 806, the process awaits completion of the DMA that was started at 802 and upon completion, the process continues to the step 808. At 804, when a DMA channel is determined to be available, the process continues to the step 808.

At step 808, an available DMA channel k is assigned by the micro-processor 117 to the server 102$j$ with the DMA request pending based on priority and arbitration. 'j' and 'k' each are integers. Next, at step 810, the micro-processor 117 programs the primary address translation table 140$j$ with entry 140_$j$_$k$ with the source/destination server buffer pointers 149_$j$_$k$ (pointers of server buffer segment 150_$j$_$k$) inside of the server 102_$j$ address space 104_$j$. Next, at 811, a determination is made as to whether data has to be written to server memory or read from server memory if the latter, the process goes to step 813, otherwise, the process goes to step 812.

At step 813, the micro-processor 117 programs the DMA with source address to the primary port memory segment k pointer 123_$j$_$k$ and destination address in the micro-processor address space 122 and the process continues to the step 814. At step 812, the micro-processor 117 programs the DMA with the source address in the micro-processor address space 122 and the destination address to primary port memory segment k pointer 123_$j$_$k$.

After steps 812 and 813, the step 814 is performed where the micro-processor 117 programs the DMA channel k of the multi-channel DMA 118 to perform the DMA operation, followed by the step 816 where DMA is initiated and the process continues to 802.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of initializing a secondary port configuration register of a non-transparent (NT) port of a PCIe switch, the initializing method using a server address space associated with at least one server including a secondary port memory map, the method comprising:
   initializing a PCIe configuration register of a secondary port as a PCIe endpoint;
   initializing a PCIe configuration register of a primary port as a PCIe bridge port; and
   using a micro-processor coupled to the PCIe switch and having associated therewith a micro-processor address space, programming a secondary address translation register with an end point memory offset to redirect all accesses from the at least one server that are directed to a secondary port memory map within the server address space to an end point memory map within the micro-processor address space.

2. The method of claim 1, further including sending an interrupt message to the micro-processor, the interrupt being indicative of changes to a plurality of PCIe configuration registers of the secondary port, the micro-processor being coupled to the PCIe switch through a PCIe bus.

3. The method of claim 2, further including the microprocessor reading the PCIe configuration registers in response to the interrupt message.

4. A shared PCIe end point system comprising:
   a PCIe switch including a plurality of non-transparent (NT) ports, each of the plurality of NT ports having a secondary port configured as an end point;
   at least one server having a server address space associated therewith, the at least one server being coupled to one of the plurality of NT ports,
   a micro-processor coupled to the PCIe switch and having associated therewith a micro-processor address space, the server address space including a secondary port memory map,
   the micro-processor being operable to:
      initialize a PCIe configuration register of a secondary port as a PCIe endpoint; and
      initialize a PCIe configuration register of a primary port as a PCIe bridge port; and
      program the secondary address translation register with an end point memory offset to redirect all accesses from the at least one server that are directed to a secondary port memory map within the server address space to an end point memory map within the microprocessor address space.

5. The shared PCIe end point system of claim 4, wherein the secondary port includes a plurality of PCIe configuration registers, further wherein the PCIe switch is operable to send an interrupt message to the micro-processor, the interrupt message being indicative of changes to a plurality of PCIe configuration registers of the secondary port.

6. The shared PCIe end point system of claim 5, further including a PCIe bus and the PCIe switch, the PCIe switch including a transparent port, wherein the PCIe bus couples the micro-processor to the transparent port of the PCIe switch.

7. The shared PCIe end point system of claim 5, wherein the microprocessor is operable to read the PCIe configuration registers in response to the interrupt message.

8. The shared PCIe end point system of claim 5, wherein the microprocessor is operable to read the PCIe configuration registers in response to the interrupt message.

9. The shared PCIe end point system of claim 6, further including a shared PCIe end point, the shared PCIe end point including the microprocessor and further including a shared device.

10. The shared PCIe end point system of claim 9, wherein the shared device is a shared storage device.

11. The shared PCIe end point system of claim 9, further including a shared PCIe end point, the shared PCIe end point including the microprocessor and further including a shared device.

12. The shared PCIe end point system of claim 10, wherein the secondary port includes a secondary address translation register.

13. The shared PCIe end point system of claim 12, wherein the secondary port includes a secondary address translation register.

* * * * *